United States Patent
Larkin

(10) Patent No.: US 7,996,507 B2
(45) Date of Patent: *Aug. 9, 2011

(54) INTELLIGENT SYSTEM CONTROL AGENT FOR MANAGING JOBS ON A NETWORK BY MANAGING A PLURALITY OF QUEUES ON A CLIENT

(75) Inventor: Michael K. Larkin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 796 days.

This patent is subject to a terminal disclaimer.

(21) Appl. No.: 11/461,355

(22) Filed: Jul. 31, 2006

(65) Prior Publication Data

US 2007/0050490 A1    Mar. 1, 2007

Related U.S. Application Data

(63) Continuation-in-part of application No. 10/050,411, filed on Jan. 16, 2002, now Pat. No. 7,085,831.

(51) Int. Cl.
*G06F 15/173* (2006.01)
(52) U.S. Cl. ...................................................... 709/223
(58) Field of Classification Search .......... 709/217–219, 709/223
See application file for complete search history.

(56) References Cited

U.S. PATENT DOCUMENTS

| | | | |
|---|---|---|---|
| 5,249,293 A * | 9/1993 | Schreiber et al. | 709/203 |
| 5,367,643 A * | 11/1994 | Chang et al. | 710/62 |
| 5,539,885 A | 7/1996 | Ono et al. | |
| 5,574,903 A | 11/1996 | Szymanski et al. | |
| 5,675,739 A * | 10/1997 | Eilert et al. | 709/226 |
| 5,826,081 A * | 10/1998 | Zolnowsky | 718/103 |
| 5,835,763 A * | 11/1998 | Klein | 718/101 |
| 5,889,989 A * | 3/1999 | Robertazzi et al. | 718/105 |
| 5,974,392 A * | 10/1999 | Endo | 705/8 |
| 6,009,455 A * | 12/1999 | Doyle | 709/201 |
| 6,012,152 A | 1/2000 | Douik et al. | |
| 6,029,175 A | 2/2000 | Chow et al. | |
| 6,067,301 A * | 5/2000 | Aatresh | 370/418 |
| 6,112,225 A * | 8/2000 | Kraft et al. | 709/202 |
| 6,119,145 A * | 9/2000 | Ikeda et al. | 709/203 |
| 6,128,642 A * | 10/2000 | Doraswamy et al. | 709/201 |
| 6,192,388 B1 * | 2/2001 | Cajolet | 718/100 |

(Continued)

FOREIGN PATENT DOCUMENTS
EP     967545     12/1999

(Continued)

*Primary Examiner* — Kenny S Lin
*Assistant Examiner* — Farhad Ali
(74) *Attorney, Agent, or Firm* — Kunzler Needham Massey & Thorpe

(57) ABSTRACT

Disclosed is a robust intelligent system control agent configured to receive user job requests, submit the user job requests to selected qualified clients for servicing, and monitor the progress of the requests. The system is also configured with the capability of relocating a system control agent from one location within a network to another location within the network and for relocating a job request from one client to another. This ability to relocate agents and jobs provides robustness and reliability to the system, allowing the agent to move to a different machine when, for example, its current host system requires maintenance or other downtime. In order to facilitate the relocation of a job request, the state of the request is temporarily stored by the agent or by other means while the job request is relocated to another client.

25 Claims, 6 Drawing Sheets

U.S. PATENT DOCUMENTS

| | | | | |
|---|---|---|---|---|
| 6,260,068 B1 * | 7/2001 | Zalewski et al. | | 709/226 |
| 6,418,458 B1 * | 7/2002 | Maresco | | 718/103 |
| 6,418,462 B1 * | 7/2002 | Xu | | 709/201 |
| 6,463,457 B1 * | 10/2002 | Armentrout et al. | | 709/201 |
| 6,505,229 B1 * | 1/2003 | Turner et al. | | 718/107 |
| 6,516,342 B1 * | 2/2003 | Feldman et al. | | 709/216 |
| 6,658,449 B1 * | 12/2003 | Brenner et al. | | 718/105 |
| 6,687,729 B1 * | 2/2004 | Sievert et al. | | 718/102 |
| 6,711,616 B1 * | 3/2004 | Stamm et al. | | 709/226 |
| 6,725,455 B2 * | 4/2004 | Staiger et al. | | 718/102 |
| 6,760,733 B1 * | 7/2004 | Komine et al. | | 707/102 |
| 6,779,023 B2 * | 8/2004 | Tognazzini | | 709/208 |
| 6,779,181 B1 * | 8/2004 | Yu et al. | | 718/102 |
| 6,813,767 B1 * | 11/2004 | Willke | | 718/101 |
| 6,823,512 B1 * | 11/2004 | Miller et al. | | 718/103 |
| 6,845,505 B1 * | 1/2005 | Adunuthula et al. | | 718/105 |
| 6,847,995 B1 * | 1/2005 | Hubbard et al. | | 709/223 |
| 7,080,159 B2 * | 7/2006 | Chu et al. | | 709/246 |
| 7,082,604 B2 * | 7/2006 | Schneiderman | | 718/100 |
| 2002/0087657 A1 * | 7/2002 | Hunt | | 709/217 |
| 2003/0050957 A1 * | 3/2003 | Hatalkar | | 709/201 |
| 2003/0120705 A1 * | 6/2003 | Chen et al. | | 709/104 |
| 2003/0135617 A1 * | 7/2003 | Larkin | | 709/225 |

FOREIGN PATENT DOCUMENTS

JP    11327909    11/1999

* cited by examiner

INTELLIGENT SYSTEM CONTROL AGENT FOR MANAGING JOBS ON A NETWORK BY MANAGING A PLURALITY OF QUEUES ON A CLIENT

CROSS-REFERENCES TO RELATED APPLICATIONS

This application is a continuation-in-part of and claims priority to U.S. patent application Ser. No. 10/050,411 entitled "INTELLIGENT SYSTEM CONTROL AGENT FOR MANAGING JOBS ON A NETWORK BY MANAGING A PLURALITY OF QUEUES ON A CLIENT" and filed on Jan. 16, 2002 now U.S. Pat. No. 7,085,831 for Michael K. Larkin, which is incorporated herein by reference.

BACKGROUND OF THE INVENTION

1. Field of the Invention

The present invention relates generally to intelligent software systems. More particularly, the present invention relates to computer systems for coordinating, distributing, and managing other software programs on a network.

2. Description of the Related Art

The computer and computer software fields are experiencing a great explosion in technological growth. The rapid generation of increasingly complex computer technology can be seen as both a boon and a bane. For instance, increasingly powerful computers and the highly complex computer programs that operate thereon provide benefits on a scale previously unseen. Computer operators are now provided with tools that achieve tasks in a fraction of the time previously required, if indeed those tasks could previously have been performed at all.

Nevertheless, this increasing sophistication comes at a price. For instance, the increasingly sophisticated computer programs now available require large amounts of specialized user training and accustomization in order to provide productivity gains. Additionally, installing, maintaining, and using such programs is effectively becoming an increasingly daunting task.

Prior art computer operating systems are provided with a job management capability that allows users to run more jobs in less time by matching the jobs' processing needs with the available resources. The prior art systems are configured to schedule jobs, and provide functions for building, submitting, and processing jobs quickly and efficiently in a dynamic environment.

A network job management and job scheduling system is a software program that schedules and manages jobs that a user submits to one or more machines under its control. These systems then accept jobs that users have submitted and review the job requirements. The machines under the control of these systems are then evaluated, and the machine best suited to run each job is chosen. These systems execute each step of a job on a machine that has enough resources to support executing and checkpointing each job step.

Prior art operating systems are also configured to accept submission of batch jobs for scheduling. Batch jobs run in the background and generally do not require any input from the user. These batch jobs are typically classified as either serial or parallel. A serial job runs on a single machine, while a parallel job is designed to execute as a number of individual, but related, processes on one or more of the system's nodes. When executed, these related processes can communicate with each other through message passing or shared memory to exchange data or synchronize their execution.

Once a machine with suitable resources has been selected, the job is dispatched to the appropriate machine. Prior art systems are configured with queues. In this description, a job queue refers to a list of jobs that are waiting to be processed. When a job is submitted by a user, the job is entered into an internal database, which resides on one of the machines, until it is ready to be dispatched to run on another machine.

Once a job has been dispatched to a machine to be processed, the job runs and is executed. A job can be dispatched to either one machine or, in the case of parallel jobs, to multiple machines. In many prior art systems, jobs do not necessarily get dispatched to machines on a first-come, first-serve basis. Requirements of the job, characteristics of the job, and the availability of machines are examined, and then the system determines the best time for the job to be dispatched.

Computer operating systems include several different operational modules. One such module is a software module responsible for coordinating, distributing, and managing job requests being run on a network. Although this type of module may have different names depending upon which operating system it is contained within, the term "agent" shall be used herein to refer to such a job-dispatch system. The agent is responsible for coordinating, distributing, and managing job requests being run on a network. However, problems arise if the computer station in which the agent resides requires maintenance or other downtime. Currently, job requests are either terminated or left incomplete if maintenance or other downtime occurs on the system containing the agent.

Often, a system administrator will submit highly complex computational tasks which require certain hardware to be present in order to be completed. If an agent does not possess the required hardware, the task may be terminated, completed incorrectly, or lost. This may also cause the machine hosting an agent to experience downtime and require maintenance. Any job requests currently located on an agent which experiences downtime or requires maintenance are either terminated or left incomplete as explained previously.

Computer systems remaining in the network which do not necessarily host an agent are considered clients. These clients are responsible for receiving the job requests from the agent, executing the job requests, and returning the result of the job request to the agent. Often, the client selected to complete the requested job is chosen automatically.

Consider the situation in which a system administrator submits a job request to be carried out by a client station within a network. The agent receives the job request and then selects which client to submit the job request to. The client selected may already have numerous job requests waiting in the queue which need to be completed. The newly submitted request will remain on the clients' queue until previously submitted requests are completed. This poses a serious problem if the newly submitted job request is of high importance and needs to be completed immediately.

A similar problem may arise if the job request submitted to the selected client is too complex for the client to execute. For instance, a job may be too complex if it entails computation that would be computationally prohibitively expensive or slow to finish or a if it requires resources such as RAM or disk space which exceed the resources installed on the client. This may cause a client to become overloaded and terminate and/or lose other job requests located in the client's queue.

A disadvantage of current software control agents is the generally limited capability of the agent with respect to managing and monitoring the state of current job requests. Furthermore, current software control agents provide no mechanism for providing manual or automatic relocation of an entire agent and job request. This lack of mobility often results in incomplete and/or unsuccessful job request completion.

SUMMARY OF THE INVENTION

The apparatus of the present invention has been developed in response to the present state of the art, and in particular, in response to the problems and needs in the art that have not yet been fully solved by currently available software control agents.

In accordance with the invention as embodied and broadly described herein in the preferred embodiments, an improved system control agent is provided. In embodiments disclosed herein, the intelligent system control agent is used to provide a user interface module configured to receive user requests, a client selection module configured to determine which client to submit the user request to, and a communication module configured to send the requests to the selected client.

In one embodiment, the intelligent system control agent also comprises a system health check module configured to be aware of the state of the client. An agent communication protocol module may be used to communicate with the software located within the client. The intelligent system control agent may also provide in one embodiment an agent endpoint module configured to allow the mobility of an agent from one system to another. A federation module may be used to allow cross-communication and interaction between multiple agents. A job relocation module may also be used to relocate a user requested job from one client to another. A state storage module may be provided to store the state of jobs being relocated from one client to another.

In one embodiment, a system for remotely controlling clients from a central location may include a plurality of clients, an agent configured to receive user requests from a user and determine which of a plurality of the clients to submit each user request to, and a communication channel configured to send the requests to the specified client.

A job execution module may also be provided. The job execution module may include determining a suitable queue for each request sent to a client. The job execution module may comprise an asynchronous queue configured to run requests simultaneously within a specified client. The job execution module may also comprise a synchronous queue configured to run requests in the order the requests were received by a specified client. The job execution module may also comprise an exclusive queue configured to run requests exclusive of any other requests in any other queue on the system.

A stub software module may also be present in the software application. The stub software module may be configured to control execution of a request once a request resides on a specified client. In certain embodiments, the stub module is used to control software that is off-the-shelf, or software in which hooks cannot be previously added to the software since the source code is not available. This stub software preferably provides basic job control, such as "stop, start, restart, cancel, etc." In this embodiment, the stub does not provide robust job management functions such as state management. The use of the stub is intended to allow the agent to control software that was not written with a distributed focus in mind. Software that is written from the ground up to take advantage of the agent's features is typically provided with its own job management functions, but may also be provided with additional features for robust job management.

In one embodiment, at least one of the clients is remote to the software agent of the system.

In one embodiment, a method of operating a software control may comprise receiving a user request, automatically determining which of a plurality of clients to submit the request to, and sending the request to the selected client over a communication channel to fulfill the request.

Certain embodiments may include a method of automatically relocating the system control agent from one computer station within a network to another computer station within a network. The method may comprise configuring an agent endpoint module to allow the mobility of an agent from one system to another.

In one embodiment, an agent communication protocol module is configured to communicate with the software located within the client. The method may comprise configuring a system health check module to be aware of the state of the client. The method may also comprise using a federation module to cross-communicate and interact between multiple agents.

A further embodiment also includes configuring a job relocation module to relocate a user requested job from one client to another. The method may comprise configuring a state storage module to store the state of user requested jobs being relocated from one client to another.

In a further embodiment, the method is used to automatically relocate a system control agent from one computer station within a network to another computer station within the network. The method may comprise a system administrator instructing an agent to relocate to a known agent endpoint, stopping to accept new job requests, waiting for pending/current requests relocations to finish, flushing in-process requests to a state storage system, requesting the new endpoint to instantiate a new agent, waiting while the new agent populates its database with the data from the state storage system, sending a message to all federated agents that the agent for this domain is relocated to the new agent, sending a message to all clients in the domain that the agent is relocated to the new agent, and sending a request from the new agent to the first agent's endpoint to close the first agent.

In one embodiment, the method automatically relocates the fulfillment of a request from one client within a network to another client within a network. The relocation may comprise instructing a client to relocate a current request by a system administrator or agent, sending the request to a state storage system by a client, sending instructions to a new client to access the request from the state storage system by an agent, accessing the request from the state storage system by the new client, and relocating the request to the new client station.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
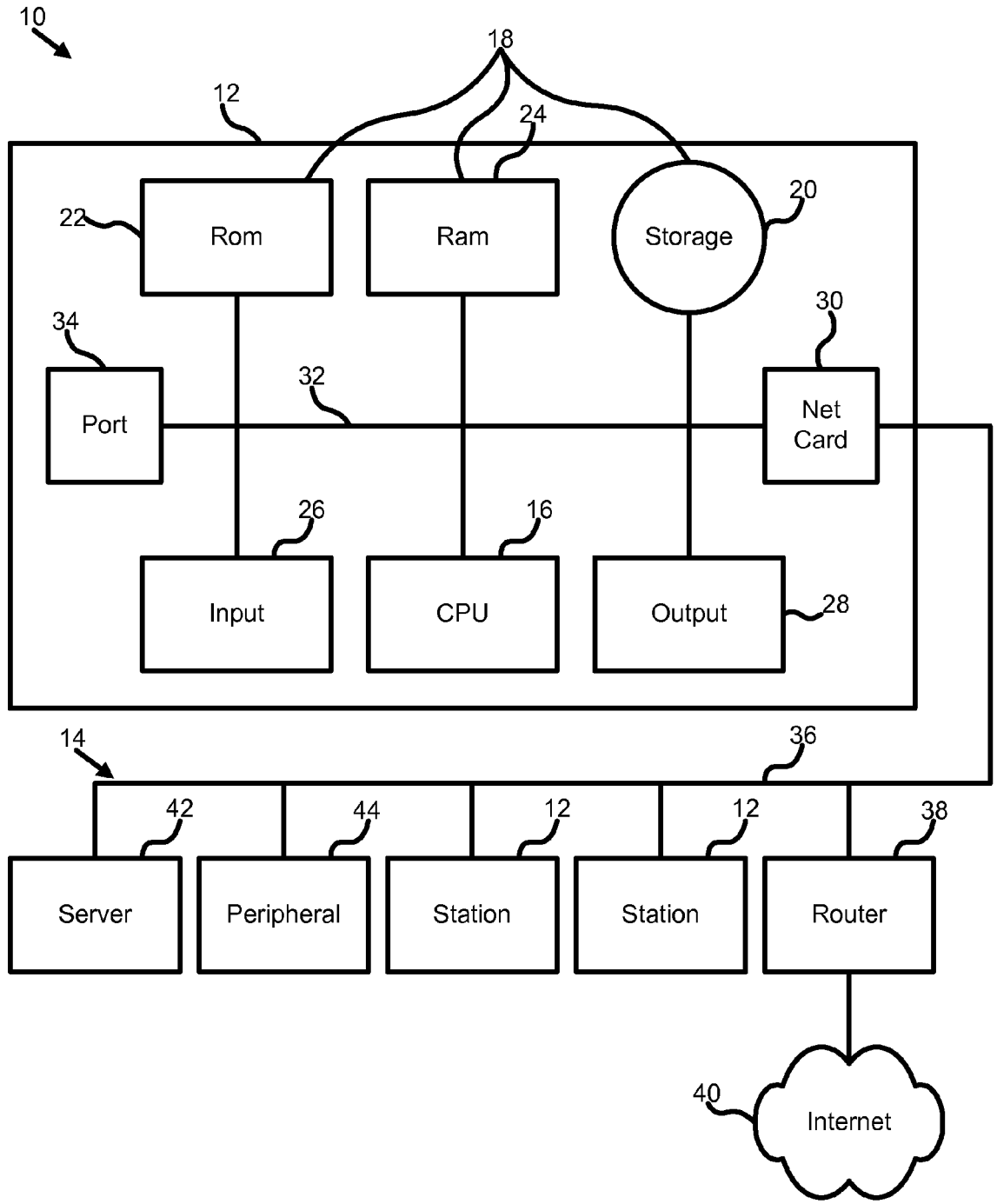
FIG. 1 is a schematic block diagram illustrating one embodiment of a computer system, for implementing the intelligent software control agent system of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIGS. 1 through 6 are schematic block diagrams and flow charts that illustrate in more detail the preferred embodiments of the present invention. The schematic block diagrams illustrate certain embodiments of modules for performing various functions of the present invention. In general, the represented modules include therein executables and operational data for operation within a computer system of FIG. 1 in accordance with the present invention.

As used herein, the term executable code, is intended to include any type of computer instruction and computer-executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, an executable could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 1 is a schematic block diagram that illustrates a computer system 10 in which modules of executable code and operational data, operating in accordance with the present invention, may be hosted on one or more computer stations 12 in a network 14. The network 14 may comprise a wide area network (WAN) and may also comprise an interconnected system of networks, particular examples of which are the Internet and the World Wide Web.

A typical computer station 12 may include one or more processors or CPUs 16. The CPUs 16 may be operably connected to one or more memory devices 18. The memory devices 18 are depicted as including a non-volatile storage device 20 such as a hard disk drive or CD ROM drive, a read-only memory (ROM) 22, and a volatile, random access memory (RAM) 24.

The computer station 12 or system 10 may also include one or more input devices 26 for receiving inputs from a user or from another device. Similarly, one or more output devices 28 may be provided within, or be accessible from, the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPUs 16, the memory devices 18, the input devices 26, the output devices 28, and the network card 30. As such, the system bus 32 and the network backbone 36 serve as data carriers and may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an intranet, or, as depicted, a system 40 of interconnected networks (an internetwork 40) such as the Internet 40. The individual stations 12 communicate with each other over the backbone 36 and/or over the Internet 40 with varying degrees and types of communication capabilities and logic capability.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
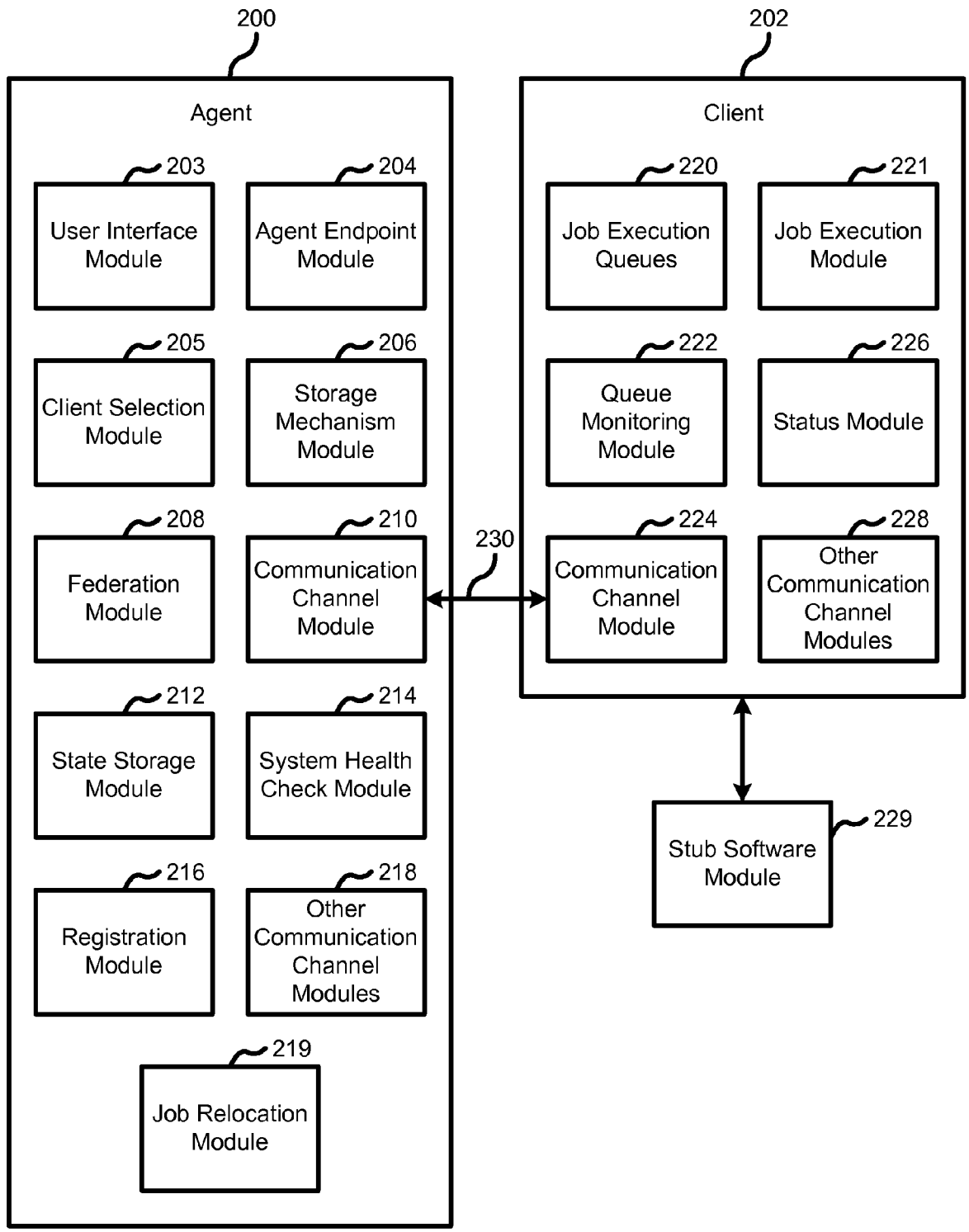
FIG. 2 is a schematic block diagram illustrating one embodiment of an intelligent software control agent of the present invention including agent and client modules.

Referring now to FIG. 2, a system control agent 200 and a client 202 of the present invention are shown in one embodiment, with each including a plurality of modules containing executable code and operational data suitable for operation by the CPUs 16 and storage within the memory devices 18 of FIG. 1. The memory devices 18 in which the modules of the present invention are located may also be distributed across both local and remote computer stations 12. In one embodiment, the system control agent 200 operates within a server 42, and a plurality of clients operate upon other system stations 12. Examples of different types of clients include printers, backup devices, hard drives, tape drives, removable drives, or the like.

In the depicted embodiment of FIG. 2, the agent 200 generally comprises a user interface module 203, an agent endpoint module 204, a client selection module 205 a storage mechanism module 206, a federation module 208, a communication module 210, a state storage module 212, a system health check module 214, a registration module 216, and various other communication channel modules 218, and a job relocation module 219.

In the depicted embodiment of FIG. 2, the client 202 generally comprises job execution queues 220, a job execution module 221, a queue-monitoring module 222, a communication module 224, a status module 226, and various other communication channel modules 228. Additionally, the client 202 may be coupled to a stub software module 229.

In one embodiment, the agent 200 and the client 202 communicate through a communication channel 230. The communication channel 230 may comprise a RMI communication adapter in one embodiment, any suitable communications mechanism may be used, including SOAP via XML, sockets, etc. The communication channel 230 in one embodiment is used to enable the agent 200 to communicate and send job requests to the client 202 through a communication channel module 210. The client 202 accesses the communication channel 230 to receive and submit requests back to agent 200 through the communication module 224. Examples of job requests include without limitation, print jobs, backup jobs, hard drive storage jobs, or the like.

The communication module 224 is also configured to submit a job request identification number to the communication channel module 210. This job request identification number is then stored in a storage mechanism module 206 and may be accessed to check on the current status of a job request submitted by the agent 200 to the client 202.

The agent endpoint module 204 is configured in one embodiment to provide a mechanism for relocation of agents from other systems within a network. The agent endpoint module 204 may also be configured to provide an instantiation mechanism for new agent instances, such as at system startup.

In the depicted embodiment, the storage mechanism module 206 is configured to store the state of the clients within the agent's domain. As used herein, the term "domain" is intended to include a range of systems, computer workstations, or network corresponding to a particular agent or agents. The storage mechanism module 206 may also be configured to store network addresses, hardware information, and load characteristics of clients located in the domain of an agent. The storage mechanism module 206 may also be configured to store the state of client job requests present in the domain of the agent.

As shown, the agent modules 200 may also comprise a federation module 208. The federation module 208 is configured to allow submission of cross-domain job requests. Using the federation module 208, an agent may submit a job request to another client not located in the domain of the first agent. The job request may then be submitted to a client that is located in the domain of the new agent and that possesses suitable hardware to complete the job request. The federation module 208 may also be configured to include a number of mechanisms that locate other agents on the network by, for instance, broadcasting to locate other agents or by performing a directory lookup on some suitable enterprise directory system.

In the depicted embodiment, the state storage module 212 is configured to store the state of job requests being relocated from one client to another. The system health check module 214 is preferably configured to periodically scan the clients executing job requests to ensure that the client machines have not crashed and that a job request has not stalled during execution on the client machine.

The agent 200 may further comprise a registration module 216. The registration module 216 is preferably configured to receive requests from new clients to be registered in the domain of the agent containing the module. The depicted embodiment also depicts various other communication modules 218. The other communication modules 218 are configured to access the agent via other means apart and separate from those previously described. Other communication Module 218 may include, but not limited to, RMI, SOAP, Sockets, etc.

Figure 3:
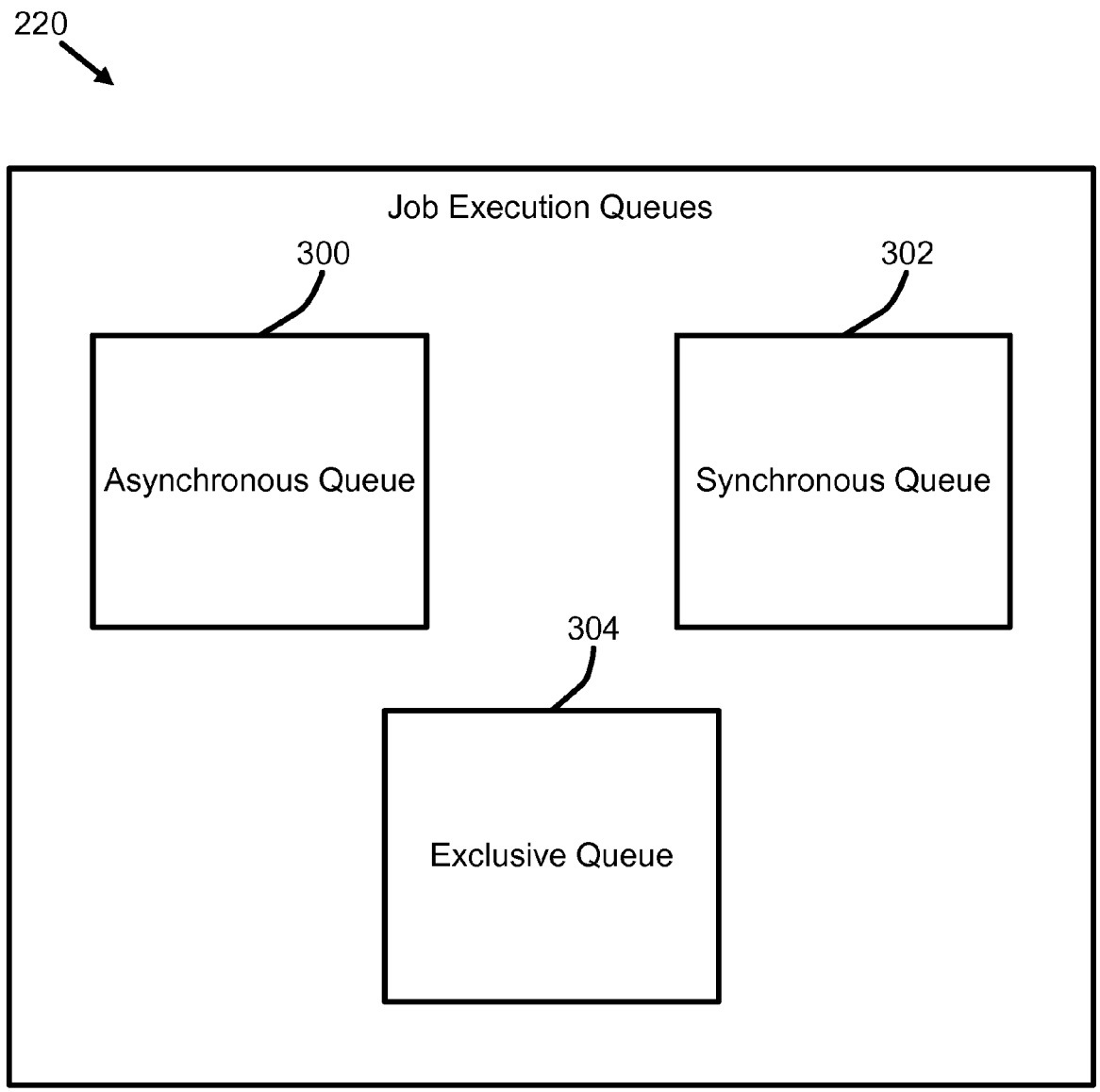
FIG. 3 is a schematic block diagram of one embodiment of a job execution queue illustrating therein modules for executing the user request.

In one embodiment, the client modules 202 comprise job execution queues 220 and a job execution module 221. The job execution module 221 may determine which type of job execution queue might be used to process a particular user request. The job execution queues 220 may comprise various types of job execution queues. In the depicted embodiment, the job execution queues 220 comprise an asynchronous queue, a synchronous queue, and an exclusive queue. A job execution queue 220 may also be configured to maintain several types of each queue previously mentioned. However, a job execution queue 220 is configured to maintain a maximum of one exclusive queue for each client. FIG. 3 shows one example in which a job execution queue 220 comprises all three types of queues.

In an alternative embodiment, the queue monitoring module 222 is configured to periodically check each job execution queue 220 and to execute the jobs contained therein, subject to criteria specified in the job, queue, and client metadata. In certain embodiments where the job to be executed comprises off-the-shelf software or software in which hooks cannot be previously added to the software since the source code is not available, a stub module 229, residing outside the agent 200 and client 202, is used to provide basic job control, such as "stop, start, restart, cancel, etc." on behalf of the monitoring module 222. As mentioned before, a stub module 229 typically provides the capability of conducting basic control functions, such as stop, start, restart, cancel, etc. In these embodiments, the stub module 229 does not provide robust job management functions such as state management. The use of the stub module 229 is intended to allow the agent 200 to control software that was not created with distributed focus in mind. Software that is created to take advantage of the agent's features is typically provided with its own job management function, but may also be provided with additional features for robust job management.

As used herein, the term "metadata" is intended to include any type of data which describes other data. Metadata is preferably stored for all object types in the system, including clients, agents, jobs, and domains.

The client 202 of FIG. 2 also preferably includes a status module 226. The status module 226 is preferably configured to be accessed by the agent to check load factors, responsiveness, and job status of previously submitted job requests. Also depicted are various other communication channel modules 228 which are configured to accept requests via the communication channel 230 and the communication channel module 224.

FIG. 3 illustrates one embodiment given by way of example, of a plurality of job execution queues 220 of FIG. 2. The job execution queues 220 include an asynchronous queue 300, a synchronous queue 302, and an exclusive queue 304.

In one embodiment, the asynchronous queue 300 is configured to dispatch job requests simultaneously, dispatching a new thread of execution for each job request received. The thread then executes the code specified in the job request. In one embodiment, the asynchronous queue 300 is also configured to be used for job requests that have a short execution time and that are completely localized.

The synchronous queue 302 is configured to dispatch job requests by the order the job requests were received. A synchronous queue 302 is configured to guarantee that submitted job requests will be dispatched in the same order in which they were received. Job requests to a synchronous queue 302 may be submitted when an individual job would consume much of the host resources. Multiple concurrent job requests in such conditions might cause the client machine to crash or cause the waiting time of a job request to increase substantially.

The job execution queues 220 in one embodiment also comprise an exclusive queue 304. The exclusive queue 304 is configured to dispatch job requests exclusive of any other job requests in any other job execution queue 220 that may be present on the system. A queue monitoring module 222 is configured to schedule job requests that are to be executed by an exclusive queue 304 first, pending completion of other job requests that may be present in other job execution queues 220.

The exclusive queues 304 may also be configured to execute job requests that must be performed without any other activity occurring on the client machine, such as a software upgrade or other critical tasks. An exclusive queue 304 is configured to execute job requests without interruption, pause in the execution, and maintain the job request on the same client machine. Preferably, other queues that may be present and running on the system are paused if execution of a job request is being completed by an exclusive queue 304.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
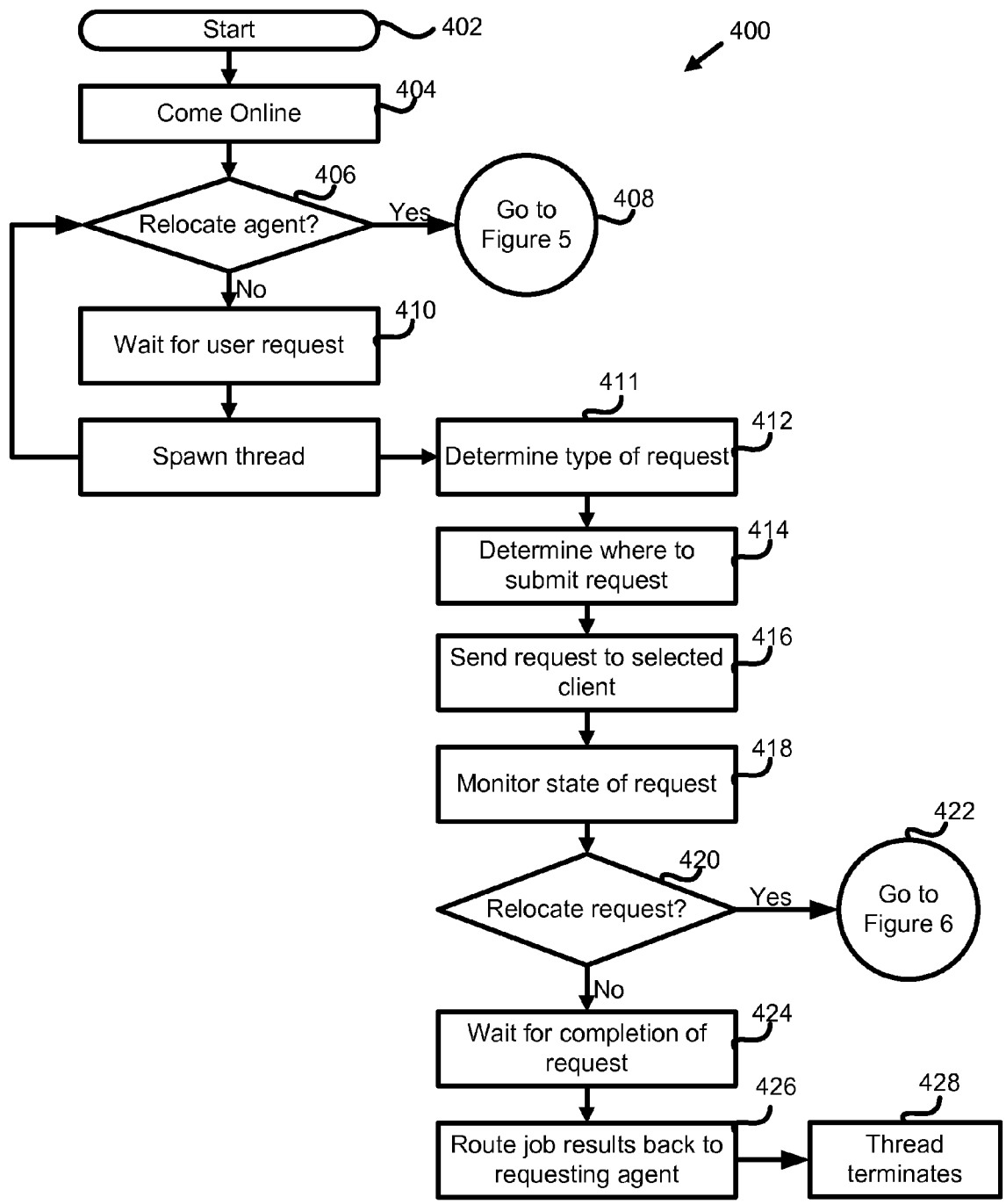
FIG. 4 is a schematic flow chart diagram illustrating one embodiment of a process for receiving, sending, and executing user requests in accordance with the present invention.
Figure 5:
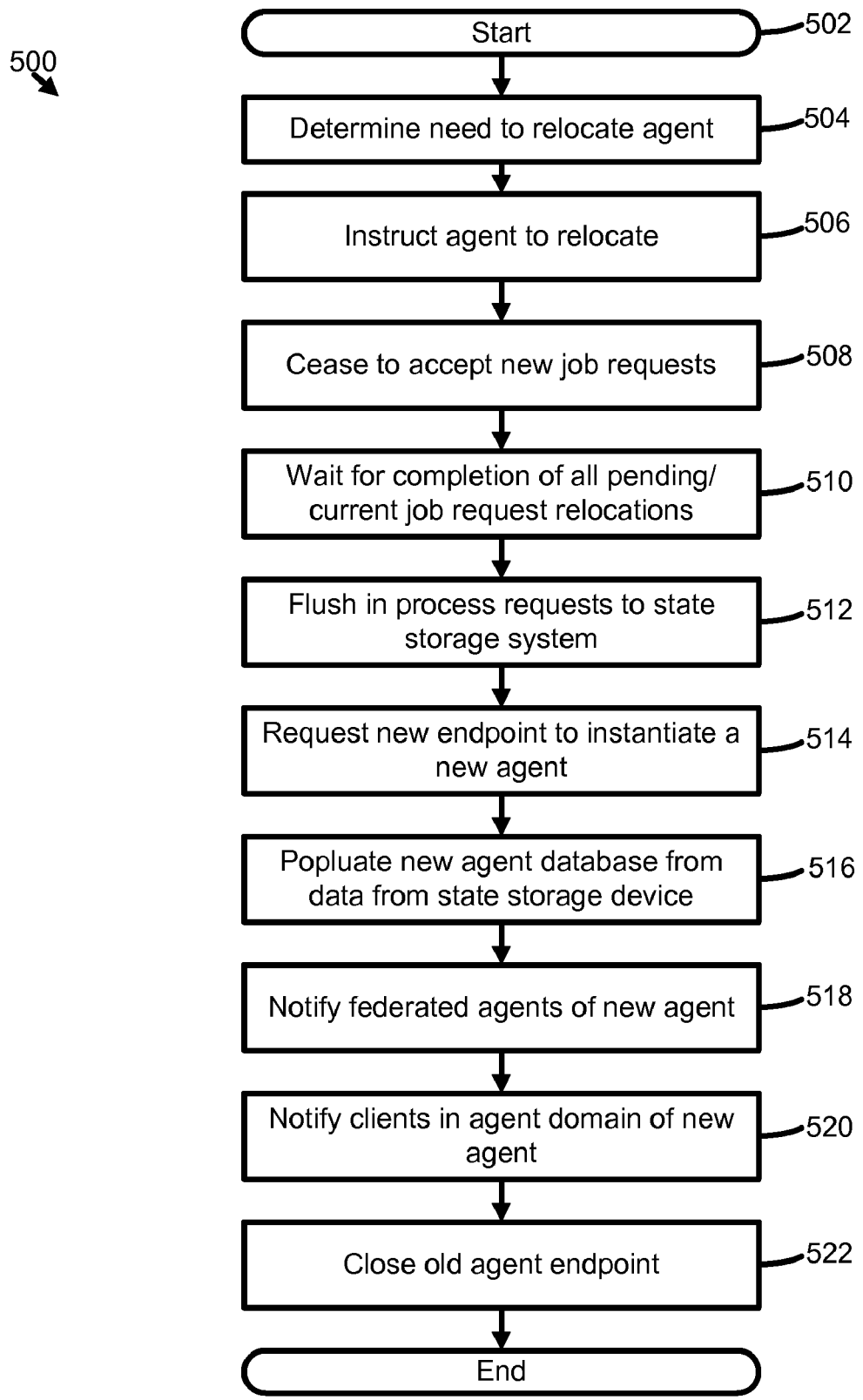
FIG. 5 is a schematic flow chart diagram illustrating one embodiment of a method of relocating an agent within a network to another computer system within a network in accordance with the present invention.

FIG. 4 is a schematic flow chart diagram illustrating one embodiment of a process 400 for receiving, sending, and executing user requests in accordance with the present invention. In one embodiment, the process 400 will be described in conjunction with the system of FIGS. 1 through 3, but it should be understood that the process 400 may also be conducted independent of that system. The process 400 starts 402, and an agent 200 comes online 404 with a network. The agent 200 proceeds to determine 406 if relocation is necessary. If an agent 200 is required to be relocated, the process 400 continues to the steps 408 that are illustrated in FIG. 5 and which will be explained hereafter.

If the agent 200 is not required to be relocated, the process 400 continues with an agent 200 waiting 410 for a user request. The user request may be submitted by a system administrator or software located on a machine where the agent is located. Indeed, any communicating user or program may submit a user request.

The process 400 is preferably threaded. That is, after receiving a user request, a thread is spawned 411 to complete the steps 412-428. The main portion of the process 400 then loops back to the relocate inquiry 406 and continues operation, potentially spawning a plurality of concurrent threads, each conducting the steps 412-428.

In each spawned thread, the agent 200 determines at a step 412 the nature of the request. By determining at a step 412 the nature of the request, the agent 200 can then select at a step 414 a communication client (which acts as a servicing station) to submit the request to. The agent 200 preferably relies on one or more predetermined criterion for making the determination. For instance, in making the determination, the agent 200 preferably determines which of the clients 202 possess the hardware and software necessary for completion of the submitted request. The agent 200 may also determine which of a plurality of qualified clients 202 is least busy or otherwise in the best position to service the request. The request is then preferably sent 416 to that client.

In each thread, the agent preferably monitors 418 the state of the request periodically. During the execution of the request, if a command is issued to relocate 420 the request, the process 400 proceeds 422 to FIG. 6. If the request is not to be relocated, the agent waits 424 for the completion of the request. Upon completion 424 of the request, the client 202 then proceeds to route 426 the job request back to the requesting agent. The thread then terminates 428.

FIG. 5 is a schematic flow chart diagram illustrating one embodiment of a method 500 of relocating an agent within a network to another computer system within the network. The method 500 starts 502, and it is determined 504 that a need exists to relocate an agent. This need may be determined automatically, or a command to relocate an agent 200 may be issued by a system administrator. Once it is determined 504 that the agent 200 needs to relocate, the agent 200 is instructed 506 to relocate to another computer system.

Upon receiving instruction to relocate 506, the agent 200 ceases 508 to accept new job requests. The method 500 then proceeds to wait 510 for all pending and/or current job requests relocations to finish. The agent in one embodiment continues to flush 512 in process requests to a state storage system as described previously in the discussion of FIG. 2.

A request 514 is then submitted to a new endpoint to instantiate a new agent. The agent may be created based upon a preexisting agent endpoint at the new location. The new agent then continues to populate 516 its database from data located on a state storage device as described previously in FIG. 2. The method 500 proceeds to notify any 518 federated agents of the new agent. In one embodiment, all clients in the agent's domain are then notified 520 of the new agent. The clients then proceed to deal with the new agent. The method 500 may also comprise requesting 522 the old agent endpoint to close. This request is preferably made by the new agent.

Figure 6:
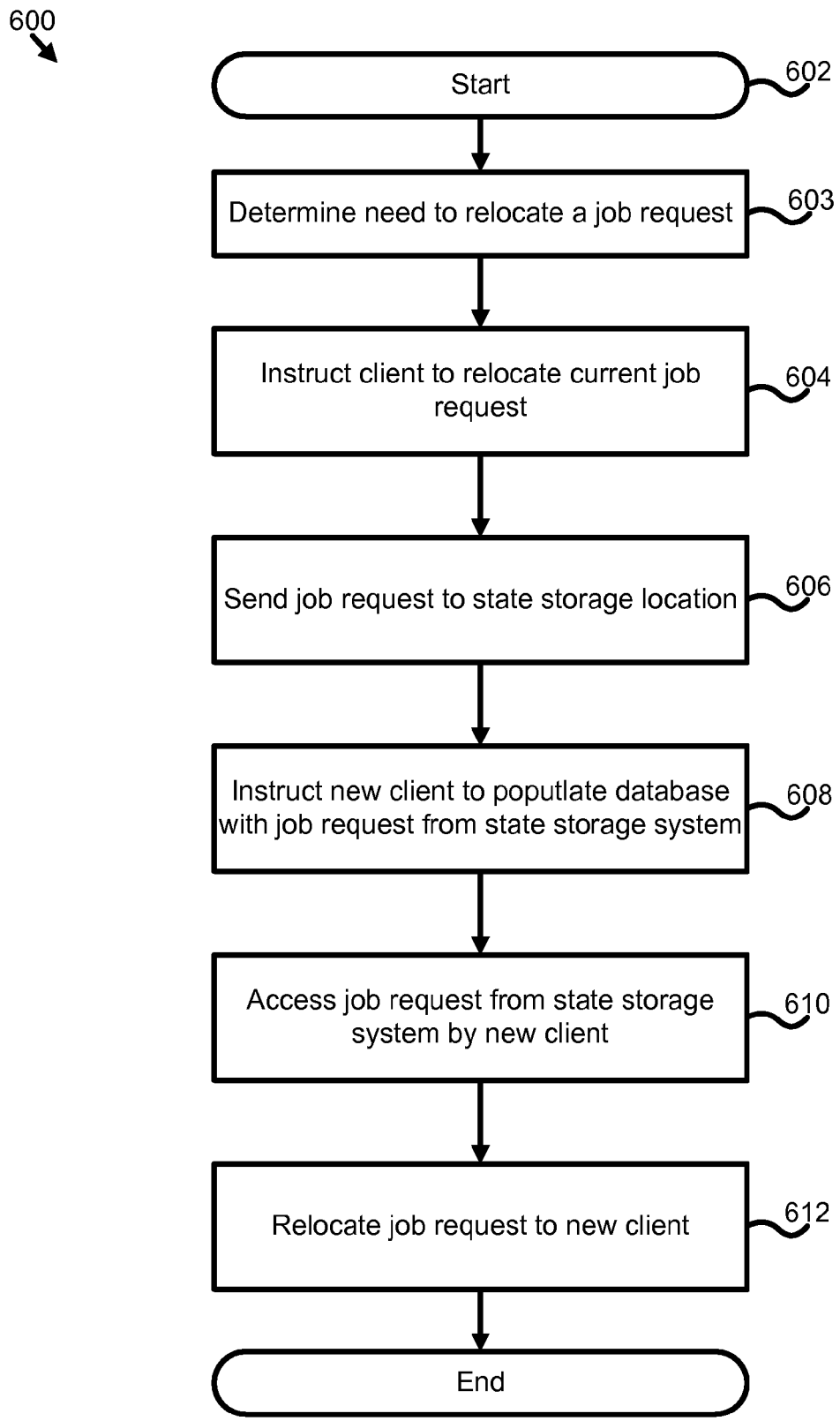
FIG. 6 is a schematic flow chart diagram illustrating one embodiment of a method of relocating a user request from one client system to another client system in accordance with the present invention.

FIG. 6 is a schematic flow chart diagram illustrating one embodiment of a method 600 of relocating a user request from one client system to another client system in accordance with the present invention.

The method 600 starts 602 and in one embodiment an agent 200 determines 601 that there is a need to relocate a job request. This may be because the current client 202 already has an extensive job queue and the completion of the present job request is of higher importance than the jobs currently listed on the client's queue. Other reasons include balancing of the system load where, for instance, a single client has many jobs and other clients have light loads. In addition, a system administrator may need to relocate jobs from one client to another due to planned system downtime for maintenance or other tasks.

Subsequently, the agent 200 instructs 604 a client 202 to relocate the job request. Upon receiving the instruction to relocate the job request, the client 202 proceeds in one embodiment to send 606 the state of the current job request to a state storage location as previously described above in the discussion of FIG. 2.

The method 600 continues by instructing 608 the new client to populate its database with the job request from the state storage system. The new client proceeds to access 610 the job request from the state storage system. The method 600 then relocates 612 the job request to the new client.

The present invention provides a convenient mechanism for receiving user requests, selecting a client to submit the user request to for servicing, monitoring the progress of the user request, and relocating the user request if necessary. The present invention also provides for the mobility of relocating agents to different machines within a network as well as relocating the current job requests to different client machines. This greater mobility and awareness of the state of submitted user requests provides reliability, flexibility, and robustness of job request servicing. One area where this ability is particularly useful is the area of print systems in that a print job of high importance may be routed to the client with the least print jobs already in the queue. Also, a print job may be routed to the client that possesses the correct hardware and software for completing the print job correctly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An intelligent system control agent for coordinating user requested jobs among a plurality of clients, comprising:
   a user interface module configured to receive a user request by way of a processor;
   a client selection module configured to select one of a plurality of clients to service the user request according to a predetermined criterion, the client selection module configured to centrally provide job request allocations for each client, each client comprising a plurality of queue types, each queue type having an individual scheme for prioritizing jobs, the plurality of queue types for each client comprising two or more of an asynchronous queue, a synchronous queue and an exclusive queue, each client further comprising a job execution module that selects one of the plurality of queue types of the selected client for queuing the user request based on characteristics of the requested job; and
   a communication module configured to submit the user request to the job execution module of the selected client;
   wherein the user interface module, client selection module, and communication module comprise one or more of logic hardware and executable code, the executable code stored on one or more non-transitory machine-readable storage media; and
   wherein the asynchronous queue is configured to dispatch job requests simultaneously, the synchronous queue is configured to dispatch job requests only in the same order in which the job requests were received, and the exclusive queue is configured to dispatch job requests either exclusively of any other job requests in any of the other queue types or when no other activity is occurring on the client.

2. The intelligent system control agent of claim 1, wherein each client comprises each of an asynchronous queue, a synchronous queue, and an exclusive queue.

3. The intelligent system control agent of claim 1, further comprising a system health check module configured to maintain an awareness of the state of the selected client.

4. The intelligent system control agent of claim 1, further comprising an agent endpoint module configured to enable the relocation of the system control agent.

5. The intelligent system control agent of claim 1, further comprising a federation module configured to allow cross-communication and interaction between a plurality of system control agents.

6. The intelligent system control agent of claim 1, further comprising a job relocation module configured to centrally relocate a user requested job from one client to another, and further comprising a state storage module configured to store the state of jobs being relocated from one client to another, the job relocation module accessing data in the state storage module to relocate a user requested job from one client to another.

7. The intelligent system control agent of claim 6, wherein relocating the user request from the selected client within the network to another client within the network further comprises:
    instructing the selected client to relocate the user request by a system administrator or agent;
    sending the user request to a state storage system by the selected client;
    sending instructions to the new client to access the user request from the state storage system by the agent;
    accessing the user request from the state storage system by the new client; and
    relocating the user request to the new client.

8. A system for remotely controlling clients from a central location, the system comprising:
    a plurality of clients, each client comprising a plurality of queue types, each queue type having an individual scheme for prioritizing jobs, the plurality of queue types for each client comprising two or more of an asynchronous queue, a synchronous queue and an exclusive queue, each client further comprising a job execution module that selects one of the plurality of queue types of the selected client for queuing a requested job based on characteristics of the requested job;
    an agent configured to receive a user request from a user and determine based upon a predetermined criterion which of the plurality of the clients to submit the user request to, the agent configured to centrally provide job request allocations for each client, each client comprising a plurality of queue types, each queue type having an individual scheme for prioritizing jobs, the plurality of queue types for each client comprising two or more of an asynchronous queue, a synchronous queue and an exclusive queue, each client further comprising a job execution module that selects one of the plurality of queue types of the selected client for queuing the user request based on characteristics of the requested job; and
    a communication channel configured to send the user request to the specified client;
    wherein the asynchronous queue is configured to dispatch job requests simultaneously, the synchronous queue is configured to dispatch job requests only in the same order in which the job requests were received, and the exclusive queue is configured to dispatch job requests either exclusively of any other job requests in any of the other queue types or when no other activity is occurring on the client.

9. The system of claim 8, wherein each client comprises at least three queue types.

10. The system of claim 8, wherein the job execution module selects an asynchronous queue in response to a job request having a short execution time.

11. The system of claim 8, wherein the job execution module selects an asynchronous queue in response to determining that a requested job is configured to run requests simultaneously within the specified client.

12. The system of claim 8, wherein the job execution module selects a synchronous queue configured to run requests in the order the requests are received by the specified client in response to determining that a job requires client resources above an acceptable threshold.

13. The system of claim 10, wherein the job execution module selects an exclusive queue configured to run requests exclusive of any other requests in any other queue on the system in response to determining that a job requires execution without interruption.

14. A method of operating a software control agent, comprising:
    receiving a user request with a first software control agent;
    automatically selecting based upon a predetermined criterion one of a plurality of clients to submit the user job request to for service of the request, each client comprising a plurality of queue types, each queue type having a different scheme for prioritizing job requests, the plurality of queue types for each client comprising two or more of an asynchronous queue configured to dispatch job requests simultaneously, a synchronous queue configured to dispatch job requests only in the same order in which the job requests were received, and an exclusive queue configured to dispatch job requests either exclusively of any other job requests in any of the other queue types or when no other activity is occurring on the client;
    sending the user request over a communication channel to the selected client;
    selecting one of the plurality of queue types of the selected client for queuing the user job request based on characteristics of the requested job; and
    relocating the first agent from one computer station within a network to another computer station within the network wherein relocating the first agent from one computer system within the network to another computer system within the network comprises instructing the first agent to relocate to a known agent endpoint by a system administrator.

15. The method of claim 14, wherein relocating the first agent from one computer system within the network to another computer system within the network further comprises requesting the new endpoint to instantiate a new agent and sending a request to the first agent's endpoint to close the first agent.

16. The method of claim 15, wherein relocating the first agent from one computer system within the network to another computer system within the network further comprises waiting while the new agent populates its database with the data from the state storage system by the agent and sending a message to all clients in the domain that the agent is relocated to the new agent by the first agent.

17. The method of claim 15, further comprising sending a message to all federated agents that the agent for a domain is relocated to the new agent by a first agent.

18. The method of claim 14, further comprising relocating a user requested job from one client to another.

19. The method of claim 14, wherein automatically relocating the agent from one computer system within the network to another computer system within the network further comprises:
- flushing in-process requests to a state storage system by the agent;
- requesting the new endpoint to instantiate a new agent by the agent;
- waiting while the new agent populates its database with the data from the state storage system by the agent;
- sending a message to all federated agents that the agent for a domain is relocated to the new agent by a first agent;
- sending a message to all clients in the domain that the agent is relocated to the new agent by the first agent; and
- sending a request to the first agent's endpoint to close the first agent by the new agent.

20. The method of claim 14, further comprising automatically relocating the user request from the selected client within the network to another client within the network.

21. The method of claim 20, wherein automatically relocating the user request from the selected client within the network to another client within the network further comprises:
- instructing the selected client to relocate the user request by a system administrator or agent;
- sending the user request to a state storage system by the selected client;
- sending instructions to the new client to access the user request from the state storage system by the agent;
- accessing the user request from the state storage system by the new client; and
- relocating the user request to the new client.

22. An article for manufacture comprising a non-transitory storage medium readable by a processor and to perform a method of operating a software control agent, comprising:
- receiving a user request;
- automatically selecting based upon a predetermined criterion one of a plurality of clients to centrally submit the request to for service of user request, each client comprising a plurality of queue types, each queue type having an individual scheme for prioritizing jobs, the plurality of queue types for each client comprising two or more of an asynchronous queue, a synchronous queue and an exclusive queue, each client further comprising a job execution module that selects one of the plurality of queue types of the selected client for queuing the user request based on characteristics of the requested job; and
- sending the user request over a communication channel to the job execution module of the selected client;
- wherein the asynchronous queue is configured to dispatch job requests simultaneously, the synchronous queue is configured to dispatch job requests only in the same order in which the job requests were received, and the exclusive queue is configured to dispatch job requests either exclusively of any other job requests in any of the other queue types or when no other activity is occurring on the client.

23. The article of manufacture of claim 22, further comprising automatically relocating a software control agent from one computer station within a network to another computer station within the network.

24. The article of manufacture of claim 22, further comprising providing an agent endpoint module configured to allow the mobility of an agent from one system to another.

25. The article of manufacture of claim 22, further comprising automatically relocating a user requested job from one client within a network to another client within the network.

* * * * *